United States Patent [19]

Llewellyn

[11] Patent Number: 5,572,505
[45] Date of Patent: Nov. 5, 1996

[54] SPRING STARTER FOR A HARD DISK DRIVE PLATTER ASSEMBLY

[76] Inventor: William D. Llewellyn, 1484 Proud Dr., San Jose, Calif. 95132-2443

[21] Appl. No.: 278,182

[22] Filed: Jul. 21, 1994

[51] Int. Cl.⁶ .......................... G11B 23/00; G11B 25/00; F03G 1/00
[52] U.S. Cl. .......................... 569/258; 369/266; 369/268; 185/41 A
[58] Field of Search .................... 369/258, 266, 369/268; 185/41 R, 41 A, 41 C, 11; 123/179 S; 318/627

[56] References Cited

U.S. PATENT DOCUMENTS

| | | | |
|---|---|---|---|
| 3,535,979 | 9/1968 | Ashley | 89/1 |
| 3,692,010 | 9/1972 | Dooley | 123/185 C |
| 3,763,842 | 10/1973 | Dooley et al. | 123/179 S |
| 3,794,901 | 2/1974 | Gendrev et al. | 318/627 |
| 3,861,374 | 1/1975 | Dooley | 123/179 S |
| 4,020,923 | 5/1977 | Taylor | 185/11 |
| 5,448,549 | 9/1995 | Baas | 369/266 |

*Primary Examiner*—Jefferson Evans
*Assistant Examiner*—Adriana Giordana
*Attorney, Agent, or Firm*—Leif R. Sloan

[57] ABSTRACT

A self-winding spring starter for rotating data storage devices. The spring is fixed on one end to a chassis or a cowling. The spring selectively engages the rotating assembly at its other end via a clutch when the rotating assembly is being stopped. The assembly stops, reverses, and fully stops again before being locked into place by a brake. The spring thus winds, unwinds, and re-winds, cocking itself in the appropriate direction for re-start.

12 Claims, 14 Drawing Sheets

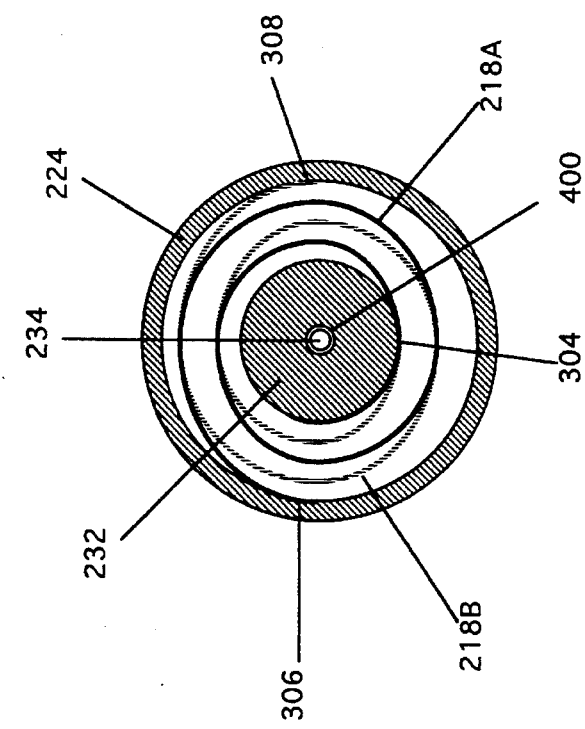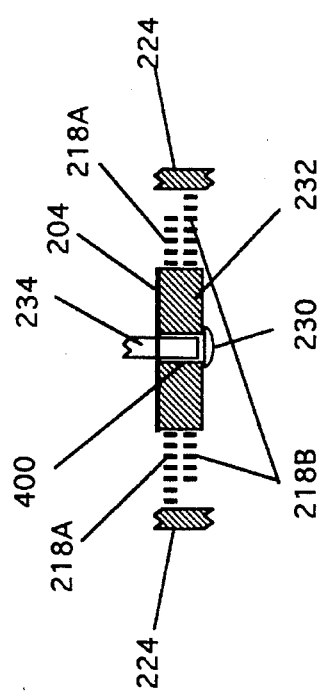
Figure 3
Figure 4

SPRING STARTER FOR A HARD DISK DRIVE PLATTER ASSEMBLY

BACKGROUND

1. Field of Invention

This invention relates to rotating machinery, specifically to rotating data storage devices such as hard disk drives, and particularly to achieving rotational start-up and power conservation in hard disk drives.

2. Discussion of Disk Drives

Present day, digital computing systems generally employ one or more data storage devices known as "disk drives" for non-volatile, random-access, mass storage of digital data. Disk drives incorporate rotating, data storage media in the form of disks or platters. These disks may be rigid or flexible. They may be coated with a magnetic emulsion for reading and writing in a fashion similar to that of magnetic recording tape, or they may be configured with a photo-sensitive layer such that data may be recorded and read by laser beam(s) in an optical data recording format. Other methods for recording on rotating media exist, and the rotating medium itself may take forms other than dusk, such as a drum. At this present time, however, disk-based media dominate the random-access, non-volatile, data mass storage field.

Three clear and driving trends exist in the disk drive marketplace at present: increasing speed, diminishing power consumption, and shrinking cost. The growing size and complexity of computer software programs drive the need for faster, more responsive disk drives in ever-smaller physical form factors. In addition, energy conservation is becoming increasingly important for battery life extension in the rapidly growing area of portable applications, as well as for environmental reasons.

In order to address the power conservation issue, disk drives are commonly placed into an idle or "sleep" mode after a pre-determined period of non-activity in order to conserve energy. In the sleep mode, only a skeletal amount of electronics remain active, and the spindle motor is de-energized, allowing the disk platter assembly to spin to a stop. When the host computing system again calls for access to disk data, the drive is re-awakened, re-energizing the electronics and the spindle motor. Unfortunately, the process of accelerating the platter assembly from a complete stop back to full operational speed has three significant drawbacks: (1) it consumes an significant amount of time (several seconds), which is in direct conflict with the desire for increased computer system speed; (2) it requires a momentary, extra large burst of energy to accelerate or "spin-up" the disks, which is in direct conflict with the desire to minimize power consumption; (3) the electrical current peak during start-up requires that both the disk drive spindle motor and the electronics which operate it be designed to handle these frequent, large, start-up surges, which conflicts with the desire to maintain low overall system cost.

It is clear, then, that a technique is needed which:
  reduces the amount of time required to start or re-awaken a stopped or "sleeping" disk drive;
  minimizes the amount of electrical surge current required to start or re-awaken a stopped or "sleeping" disk drive;
  achieves this re-restart function cheaply, reliably, and with a minimum of complexity or additional components.

3. Discussion of Prior Art

Techniques exist in practice which incorporate spring-assisted starting of rotating machinery. U.S. Pat. Nos. 3,692, 010 (Dooley and Harasta, Sep. 19, 1972) and 3,861,374 (Dooley and Harasta, Jan. 21, 1975) describe techniques by which energy is drawn off an operating, internal combustion engine and stored in a spring, later to be used to assist in re-starting the engine. U.S. Pat. No. 3,535,979 (Ashley and Tassie, Oct. 27, 1970) describes a method by which the kinetic energy of rotating machinery within a rocket launcher is recaptured while the rotation is stopping. The techniques described in both Dooley and Harasta patents actually increase the engine's operating load because they wind the spring while the engine is running. The first Dooley and Harasta patent lacks simplicity and involves a host of components including belt, cam, lever, reciprocating armature, clutching, and tension sensing mechanisms. The second Dooley and Harasta patent continuously wastes operating energy in the form of frictional losses because the spring's maximum winding tension is regulated by a slip clutch. Furthermore, both the second Dooley and Harasta patent and the Ashley and Tassie patent employ non-trivial, planetary gearing systems which are used (a) to transfer the rotational energy between the rotating machinery and the spring and (b) to achieve the needed reversal of direction of spring force after winding for proper direction of re-start. This use of planetary gearing technique(s) adds cost to the overall machinery, and inherently reduces reliability because of its complexity.

None of the above mentioned prior art references in any way involves a disk drive or data storage mechanism.

OBJECTS AND ADVANTAGES

Accordingly, several objects and advantages of the starter of this invention are:
  Faster acceleration of a disk drive's platter assembly to its final rotational speed than is achievable with a spindle motor alone allowing data read/write operations to be made very quickly.
  Very simple, straightforward attainment of appropriate starting force direction, without any gearing or complex torque reversing mechanism.
  Recapture/conservation of otherwise wasted kinetic (rotational) energy at shut-down.
  No energy drain during normal operation, preserving battery life.
  Re-use of captured energy at start-up, preserving battery life.
  Allows the disk drive to be put to sleep after shorter pauses in computer host activity because it can be re-awakened more quickly. Since this further reduces the total amount of time the drive is awake, it conserves additional energy and further extends battery life.
  Reduction in peak-current and peak-torque requirements in the spindle motor and motor driver electronics, reducing their size and cost.

Other objects and advantages also exist which will become apparent from the specification and drawings.

DESCRIPTIONS OF DRAWINGS

FIG. 3 shows a top-down, cut-away view along line 3 of FIG. 2B, exposing the spring mechanism of the starter of this invention.

FIG. 4 shows a cut-away side view of the spring mechanism, enlarging the area bisected by line 3 in FIG. 2B.

SPRING STARTER IN A GENERALIZED MACHINE

Figure 1:
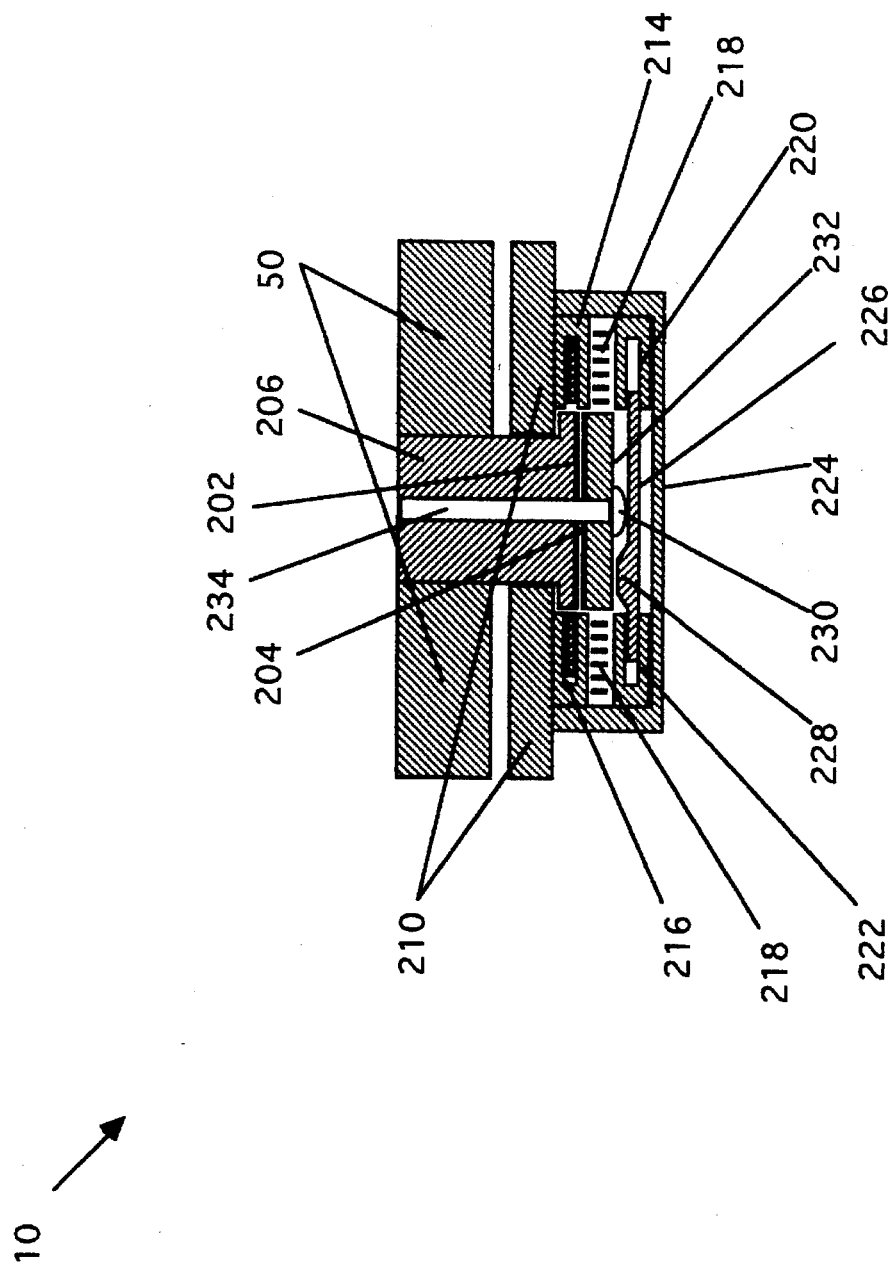
FIG. 1 shows a cut-away view of a generalized machine including the starter of this invention; most elements of this invention are visible in this drawing.

Referring now to FIG. 1, the starter of this invention is shown incorporated within a generalized machine 10, including a rotating flywheel 50. Most components of the starter of this invention are visible in FIG. 1, with the remaining elements exhibited in subsequent figures as described below. Flywheel 50 is actually generic in nature and represents a broad range of rotating devices; that is, it may be replaced by other rotational mechanism(s), including, but not limited to, a motor armature, a rotating core or yoke, an assemblage of disk drive platters, a rotating magnetic recording head drum, an impact wrench rotor, or a turbine.

Figure 7:
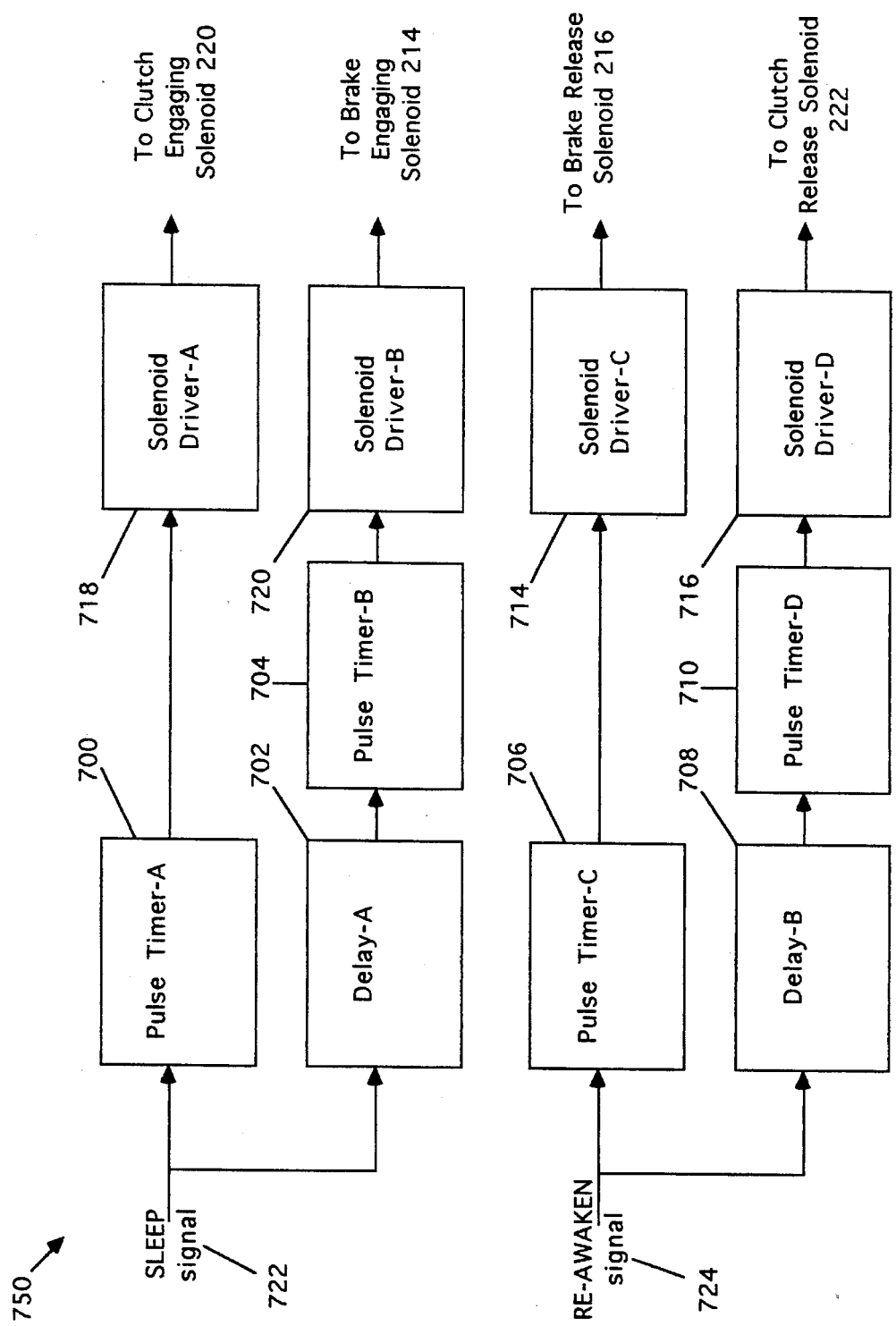
FIG. 7 shows solenoid control electronics, in block form.

Key components of the starter of this invention include: energy diverting means as embodied in a clutch top plate 202 and a clutch bottom plate 204; energy storing means as embodied in a compound spring 218; holding means as embodied in brake pads 500 and a brake frame 502 (FIGS. 5A and 5B); and control means as embodied in solenoid control electronics 750 (FIG. 7). The explicit details of the physical description and operation of the starter of this invention are deferred to the specific hard disk drive embodiment described below. All elements of FIG. 1 are preserved in this disk drive embodiment, with the exception of the generalized rotating element, flywheel 50, which has been replaced by a plurality of other, more specific, rotating elements.

DESCRIPTION OF DISK DRIVE EMBODIMENT-FIGS. 2A–6

Figure 2A:
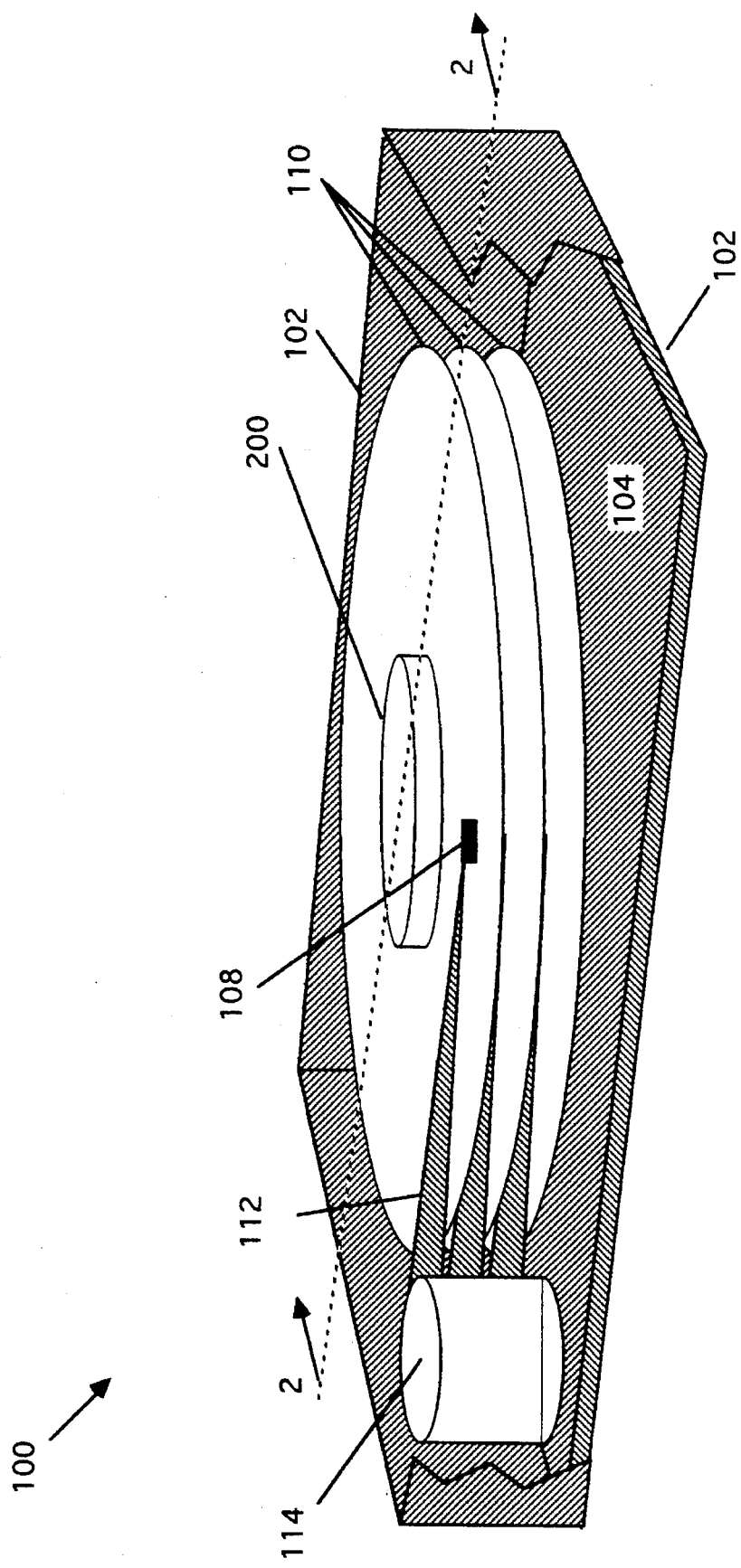
FIG. 2A shows a fragmentary, cutaway, perspective view of a disk drive, highlighting selected, conventional components of the unit.

FIG. 2A shows several key, conventional components in a disk drive. The spring starter of this invention lies beneath the hub/platter assembly in the region of a spindle motor 210, as shown in FIG. 2B.

Conventional components of a disk drive

Referring now to FIG. 2A, conventional components of a disk drive assembly 100 include a chassis 102, a printed circuit board 104, read/write head(s) 108, disk platter(s) 110, head armature(s) 112, a head armature actuator 114, and a spindle cap 200. Additional, conventional components shown in FIG. 2B include a drive shaft 206, spacer ring(s) 208, and spindle motor 210. Spindle motor 210 is shown in a through-hole mounting position in printed circuit board 104, but may be mounted by other methods as well, such as by direct fastening to the outer shell of disk drive 100 or chassis 102. Disk platter(s) 110, spindle cap 200, drive shaft 206, and spacer ring(s) 208 are fastened together as a single, rotating assembly supported by bushings (not explicitly shown) in spindle motor 210. This grouping of components constitutes the platter assembly in these discussions, which also is a conventional assemblage in disk drives. FIG. 2B shows two platters, though disk drives can have as few as one platter or as many as 16 (or more) platters.

Figure 2B:
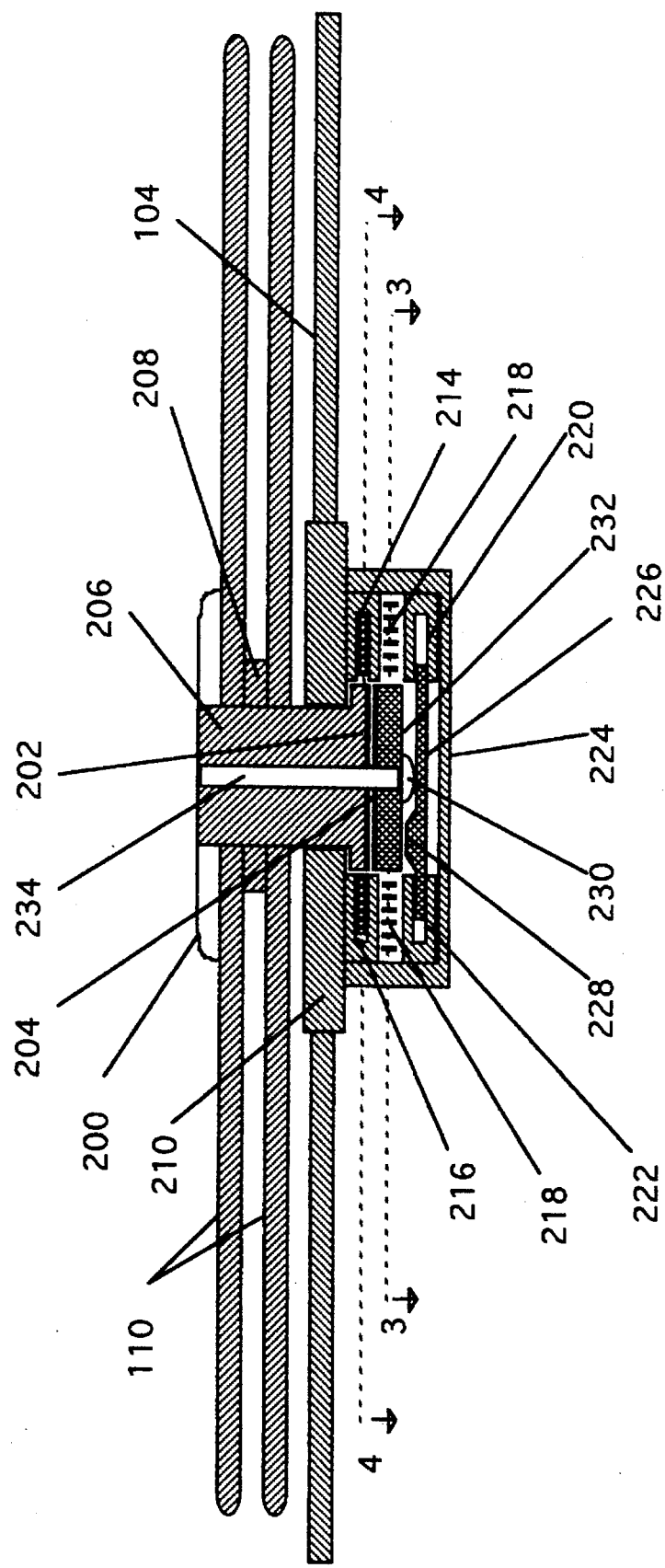
FIG. 2B shows a cut-away view of the disk drive platter assembly along line 2 in FIG. 2A; most elements of this invention are visible in this drawing.
Figure 5A:
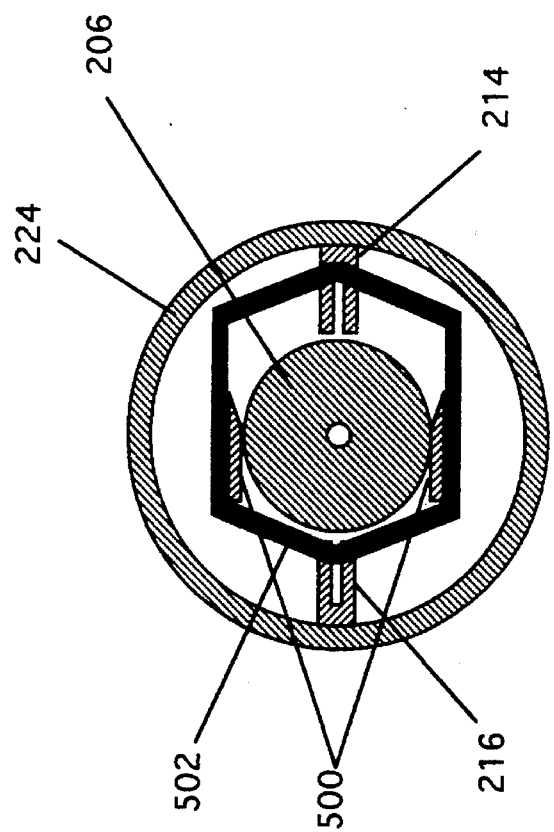
FIGS. 5A and 5B show a top-down, cut-away view along line 4 of FIG. 2B, exposing the braking mechanism in its released and engaged positions, respectively.
Figure 5B:
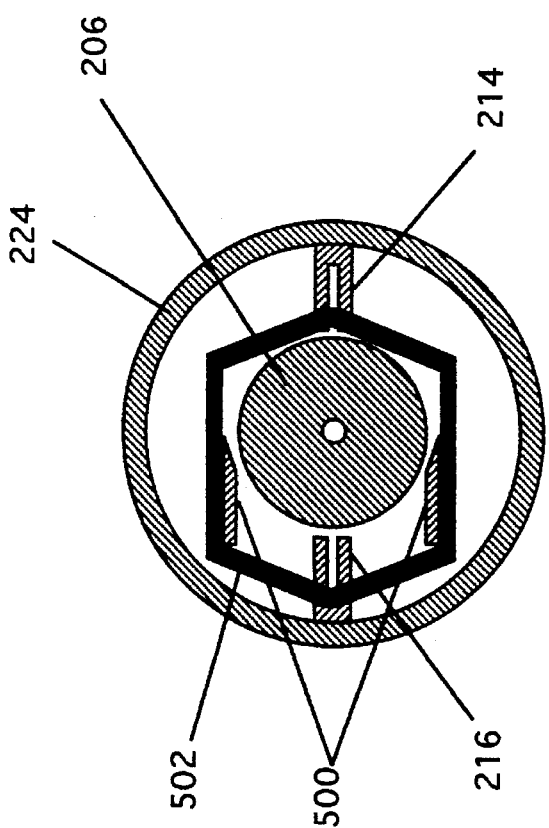

Included in FIGS. 1 and 2B, and highlighted in FIGS. 5A and 5B, is a general (conceptual) form of braking mechanism. Use of a braking mechanism is also known practice in disk drives, although it is not necessarily common. The braking mechanism illustrated here consists of a brake engaging solenoid 214 and a brake releasing solenoid 216, as well as brake pads 500 and brake frame 502. The outer surface of drive shaft 206 provides a frictional surface for brake pads 500 during braking action. Solenoids 214 and 216 are fixed at the top of a cowling 224 as shown in FIG. 2B, radially opposing one another about the rotational axis of drive shaft 206. Brake frame 502, shown in FIGS. 5A and 5B, resides between and connects to the armatures of solenoids 214 and 216. Brake frame 502 has only one degree of freedom such that it can move to the left by the action of solenoid 216 (to release the brake) as shown in FIG. 5A, or move to the right by the action of solenoid 214 (to engage the brake) as shown in FIG. 5B. Solenoids 214 and 216 only require a very brief burst of electrical energy to slide brake frame 502 into either its left-hand or right-hand position. After this, brake frame 502 remains in its chosen position without any energy applied to either solenoid.

Figure 6:
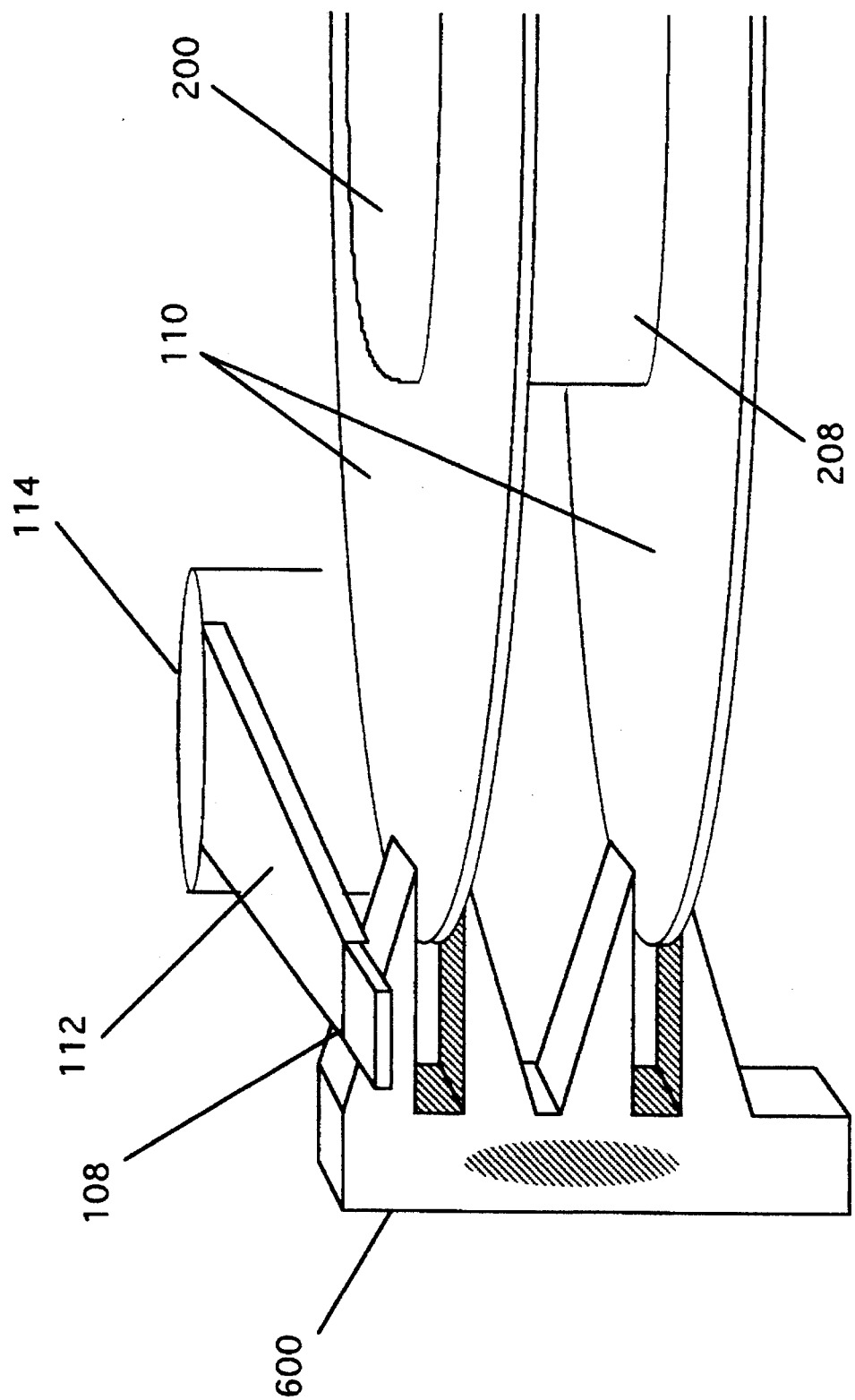
FIG. 6 shows a perspective view of the platter assembly with head armature retracted onto a head retraction ramp (known art); for simplicity, only one head armature is shown.

Referring now to FIG. 6, one can see head retraction ramp(s) 600 with read/write head(s) 108 in the retracted (off-disk) position. Only one head armature 112 is shown for simplicity. Small form-factor disk drives commonly include this head retraction technique. Disk drive 100 normally keeps head(s) 108 retracted onto ramp(s) 600 when disk drive 100 is off or asleep, as well as when accelerating to operational speed or decelerating to a stop. This serves to reduce friction during start-up, and prevents head(s) 108 from impacting the surface(s) of disk platter(s) 110 if disk drive 100 is jarred during transport. Disk drive 100 swings head(s) 108 toward the center of the platter assembly and onto disk platter(s) 110 surface(s) only after the platter assembly is rotating at full operational speed and ready for read/write operations. Disk drive 100 swings head(s) 108 back off disk platter(s) 110 surface(s) and onto ramp(s) 600 whenever disk drive 100 is being stopped. Although not essential to the starter of this invention, the moving of head(s) 108 onto ramp(s) 600 whenever the platter assembly is not operating at full rotational speed provides advantageous reduction in frictional losses. The reduction in frictional losses facilitates: (a) maximization of re-captured kinetic energy of rotation of the platter assembly as potential energy in spring 218 during platter assembly stopping; (b)

maximization of transfer of potential energy from spring 218 into kinetic energy of rotation in the platter assembly during re-acceleration.

Also conventional to disk drives, though not shown in any drawing, are the disk drive electronics, which generally reside on printed circuit board 104. These perform the various electrical functions in disk drive 100 such as head armature actuator 114 control, spindle motor 210 control, data handling, power management, computer host interfacing, and so on. Referring now to FIG. 7, the disk drive electronics do provide the starter of this invention with a SLEEP signal 722, which indicates that the stopping (or sleep) sequence is being initiated, as well as supplying a RE-AWAKEN signal 724, which indicates that the starting sequence is being initiated. Apart from this, the disk drive electronics' functions are separate from the starter of this invention, and are not elaborated upon here.

Components specific to the starter of this invention

Spring

Referring now to FIGS. 2B, 3, and 4, compound spring 218 comprises a clockwise-wound, concentric-coil (clocktype) sub-spring 218A, and a counter-clockwise-wound, concentric-coil sub-spring 218B. Both sub-springs 218A and 218B attach to a spring hub 232 at spring attachment point 304, as well as to cowling 224 at clockwise wound spring cowling attachment point 306 and at counter-clockwise wound spring cowling attachment point 308. Two opposing sub-springs (218A and 218B) enable spring 218 to wind to equal displacement in either direction, as will be explained later. A single, concentric-coil spring is generally effective for winding only in the direction which causes its coil to contract toward its center axis (forward winding), as in spring-operated alarm clocks. Such a spring, if wound "backward" (expanding its coil) far enough to store a significant amount of energy, may buckle. This would be particularly true of a spring of narrow gauge metal, as the preferred embodiment of the starter of this invention employs. In the unwound (relaxed) position of spring 218, sub-springs 218A and 218B are actually forward wound in opposition to one another and will balance in a neutral position where their tensions are equal. The winding of spring 218 in either direction (by rotating spring hub 232) simply increases the forward winding of one of sub-springs 218A or 218B while reducing the forward winding of the other. This allows winding of spring 218 to significant tightness while preventing reverse winding of either sub-spring 218A or 218B to the point where there is a risk of buckling.

Clutch

Referring still to FIGS. 2B, 3, and 4, spring hub 232 is journaled on, and rotates freely about, a clutch guide shaft 234, which is fixed at the center of drive shaft 206. Spring hub 232 has a bushing 400 designed such that spring hub 232 can both rotate about and slide along the axis of rotation of clutch guide shaft 234, allowing for engagement of clutch top plate 202 with clutch bottom plate 204 when desired. Spring 218 has a natural tendency to hold spring hub 232 in the same plane as its windings (that is, it elastically opposes vertical motion) and thus provides a spring-back action to any vertical displacement. This biases clutch bottom plate 204 into a disengaged position with respect to clutch top plate 202. At the center of the bottom of spring hub 232 is a nipple 230. When pressed vertically (upward), nipple 230 pushes spring hub 232 upward along clutch guide shaft 234, causing clutch top plate 202 to engage with clutch bottom plate 204. When clutch plates 202 and 204 engage, both clutch bottom plate 204 and spring hub 232 will rotate in full synchronism with the disk platter assembly, without slippage. A clutch engaging solenoid 220 and a clutch releasing solenoid 222 are fixed at the bottom of cowling 224, radially opposing one another about the rotational axis of drive shaft 206 and sharing a common axis of armature motion. Both clutch engaging solenoid 220 and clutch releasing solenoid 222 share a clutch control armature 226. Thus the center axis of armature 226 resides directly beneath the center of nipple 230 and perpendicular to the axis of rotation of drive shaft 206. Armature 226 has a cam 228 located partially to one side of the center of its axial length, toward solenoid 222. This allows cam 228 to engage and press nipple 230 when solenoid 220 pulls armature 226 to the right, and to release and disengage from nipple 230 when solenoid 222 pulls armature 226 to the left. Cam 228 has a flat (or plateaued) top portion which is perpendicular to the axis of rotation of drive shaft 206 and spring hub 232. This prevents nipple 230 from riding down cam 228 (that is, pushing armature 226 out of its desired position) when armature 226 is in its right-hand position.

Solenoid control

Referring now to FIG. 7, one can see solenoid control electronics 750, in block form, which operate (energize) solenoids 214, 216, 220, and 222 at appropriate times. Solenoid electronics 750 consist of four simple electronic timers, two delay elements, and four electrical solenoid drivers. (Methods for constructing digital pulse timers, delay elements, and solenoid drivers are well known to those skilled in the art, and are therefore not elaborated upon here.) Solenoid electronics 750 reside on printed circuit board 104, but because of their low profile and small size they are not exhibited in any figure other than FIG. 7. All four solenoids 214, 216, 220, and 222 function independently and operate based on SLEEP signal 722 and RE-AWAKEN signal 724 given by the disk drive electronics. A pulse timer-A 700, a pulse timer-B 704, a pulse timer-C 706 and a pulse timer-D 710 control solenoids 220, 214, 216, and 222, respectively. A solenoid driver-A 718, a solenoid driver-B 720, a solenoid driver-C 714, and a solenoid driver-D 716 intervene in each solenoid 214, 216, 220, and 222 control line, respectively. Solenoid drivers 718, 720, 714, and 716 function simply as electrical amplifiers to provide sufficient current to operate each solenoid. Each of pulse timers 700, 704, 706, and 710 generates an electrical output pulse of very short duration, sufficient only to produce the desired mechanical action in its respective solenoid, and then to shut off. This guarantees the electrical energy used to perform solenoid action is kept to an absolute minimum. A delay-A 702 and a delay-B 708 anticipate the amount of time required for platter assembly stopping and starting, respectively, and control the operation of solenoids 214 and 222 accordingly, as is described in the Operation section, below.

Because the speeds, masses, and forces involved in the stopping and starting processes never change (i.e., are repeatable), the amount of time involved in each process is also highly predictable and repeatable. This allows for the use of simple, timer-based delays 702 and 708 to anticipate the amount of time required to fully stop and fully accelerate the platter assembly, respectively. Methods for constructing timers are well known to those skilled in the art and are not elaborated upon here. Those skilled in the art will also recognize how platter assembly stopping and final operating velocity can be determined by a variety of other means, any of which could be used to replace delay-A 702 and delay-B 708. These alternative methods include speedometers, accelerometers, and position sensors. Again, methods for implementing these are well known and will not be elaborated upon here.

OPERATION-FIGS. 2B–7

Stopping sequence

During normal operation of disk drive 100, the platter assembly, including disk platter(s) 110, drive shaft 206, and clutch guide shaft 234, spin freely under the power of spindle motor 210 with no clutch or brake engaged. When disk drive 100 is put to sleep, the disk drive electronics park head(s) 108 on ramp(s) 600, de-energize spindle motor 210 and transmit SLEEP signal 722 to solenoid electronics 750. Pulse timer-A 700, triggered by SLEEP signal 722, gives clutch engaging solenoid 220 a momentary flow of current via solenoid driver-A 718, pulling clutch control armature 226 to the right. Simultaneously, delay-A 702 begins its timing action, preventing SLEEP signal 722 from reaching pulse timer-B 704 until later in the stopping sequence. Cam 228 engages nipple 230 and presses it upward, forcing spring hub 232 upward until clutch bottom plate 204 engages with clutch top plate 202. Sufficient pressure is applied via nipple 230 to cause clutch bottom plate 204 and clutch top plate 202 to engage fully with no slippage. Armature 226 slides into its extreme right-hand position, leaving nipple 230 on the plateau of cam 228. Pulse timer-A 700 cuts off current to solenoid 220 as armature 226 reaches its extreme right-hand position. Since the downward pressure of nipple 230 is perpendicular to the horizontal portion (plateau) of cam 228, armature 226 experiences no lateral force and remains in its right-hand position. With clutch plates 202 and 204 fully engaged, spring hub 232 rotates in synchronism with drive shaft 206, spring 218 begins winding, and the platter assembly decelerates. This action continues until the rotational energy of the platter assembly transfers into spring 218 as flexure (potential energy) and the platter assembly briefly stops. The platter assembly then begins to accelerate in the opposite direction until spring 218 fully unwinds and the platter assembly spins at nearly its full operational velocity, but backwards. Spring 218 then decelerates the platter assembly again, converting the rotational energy back into spring flexure, until the platter assembly stops for a second time. Simultaneous to this second stopping of the platter assembly, delay-A 702 finishes its delay period and triggers pulse timer-B 704, which momentarily energizes brake engaging solenoid 214 via solenoid driver-B 720. Solenoid 214 pulls brake frame 502 to the right, engaging brake pads 500 against drive shaft 206, thereby locking drive shaft 206 in a stopped position. Pulse timer-B 704 immediately de-energizes solenoid 214. Brake pads 500 diametrically oppose one another on drive shaft 206, and are pushed with equal force in opposite directions by spring 218. This results in no net lateral force pushing brake frame 502 in either direction. Brake pads 500 thus remain engaged to drive shaft 206 with no energy applied to any solenoid.

The spring 218 wind-up sequence at the initiation of disk drive 100 sleep or stop period is thus complete. Spring 218 is loaded, at this point, with the energy re-captured from the formerly rotating disk platter assembly, and applies force in the direction of normal disk rotation. Spring 218, when wound in this manner, contains substantially all of the former kinetic energy the platter assembly possessed when spinning at full rotational speed, less the relatively small frictional and vibration losses incurred during the stopping, reversal, and re-stopping sequence. Spring 218 thus stands ready to re-impart this energy to the platter assembly at start-up.

Start-up sequence

When disk drive 100 is started or re-awakened, the disk drive electronics energize spindle motor 210 and transmit RE-AWAKEN signal 724 to solenoid electronics 750. Pulse timer-C 706 gives brake release solenoid 216 a momentary flow of current via solenoid driver-C 714, pulling clutch control armature 226 to the right. Simultaneously, delay-B 708 begins its timing action, preventing RE-AWAKEN signal 724 from reaching pulse timer-D 710 until later in the starting sequence. Pulse timer-C 706 energizes solenoid 216 only long enough by to pull brake frame 502 fully to the left and disengage brake pads 500 from drive shaft 206. The platter assembly then becomes free to rotate. Spindle motor 210 and spring 218 act together to accelerate the platter assembly toward its full operating speed. Delay-B 708 completes its delay period just as spring 218 has fully unwound to its neutral position and triggers pulse timer-D 710. At this point, the platter assembly has very nearly completed its acceleration. Pulse timer-D 710 energizes solenoid 222 momentarily via solenoid driver-D 716, moving armature 226 to its extreme left-hand position. Armature 226 disengages cam 228 from nipple 230, allowing spring hub 232 to return to its relaxed position, disengaging clutch bottom plate 204 from clutch top plate 202. Spindle motor 210 continues to operate, providing the final fraction of acceleration necessary to make up for losses experienced during stopping and starting sequences. Spindle motor 210 then maintains the platter assembly at normal operating speed.

This completes the spring-assisted start-up sequence at the initiation of disk drive 100 start-up or re-awakening. The disk drive electronics at this point un-park head(s) 108 from ramp(s) 600, moving them out over the recording surface(s) of disk platter(s) 110 for normal read/write operations.

OPERATION-FLOW CHARTS

Figure 11A:
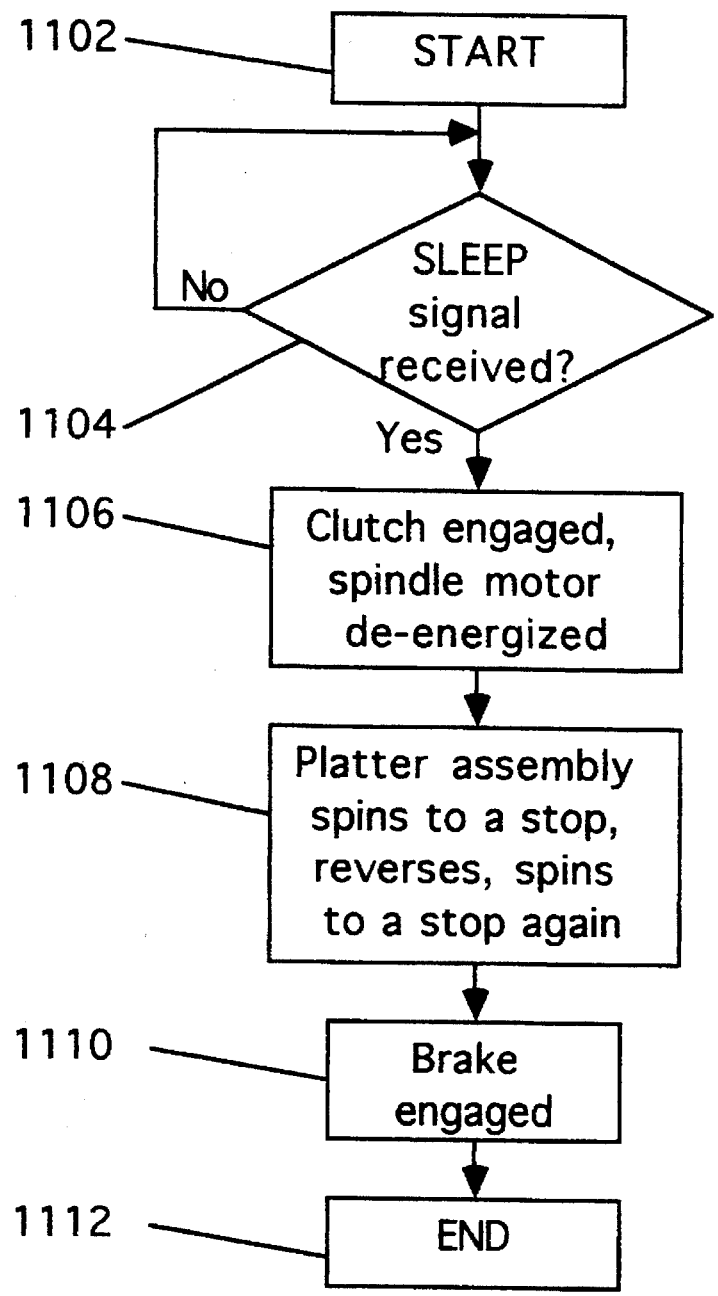
FIG. 11A shows the operation of the preferred stopping sequence in flow chart form.
Figure 11B:
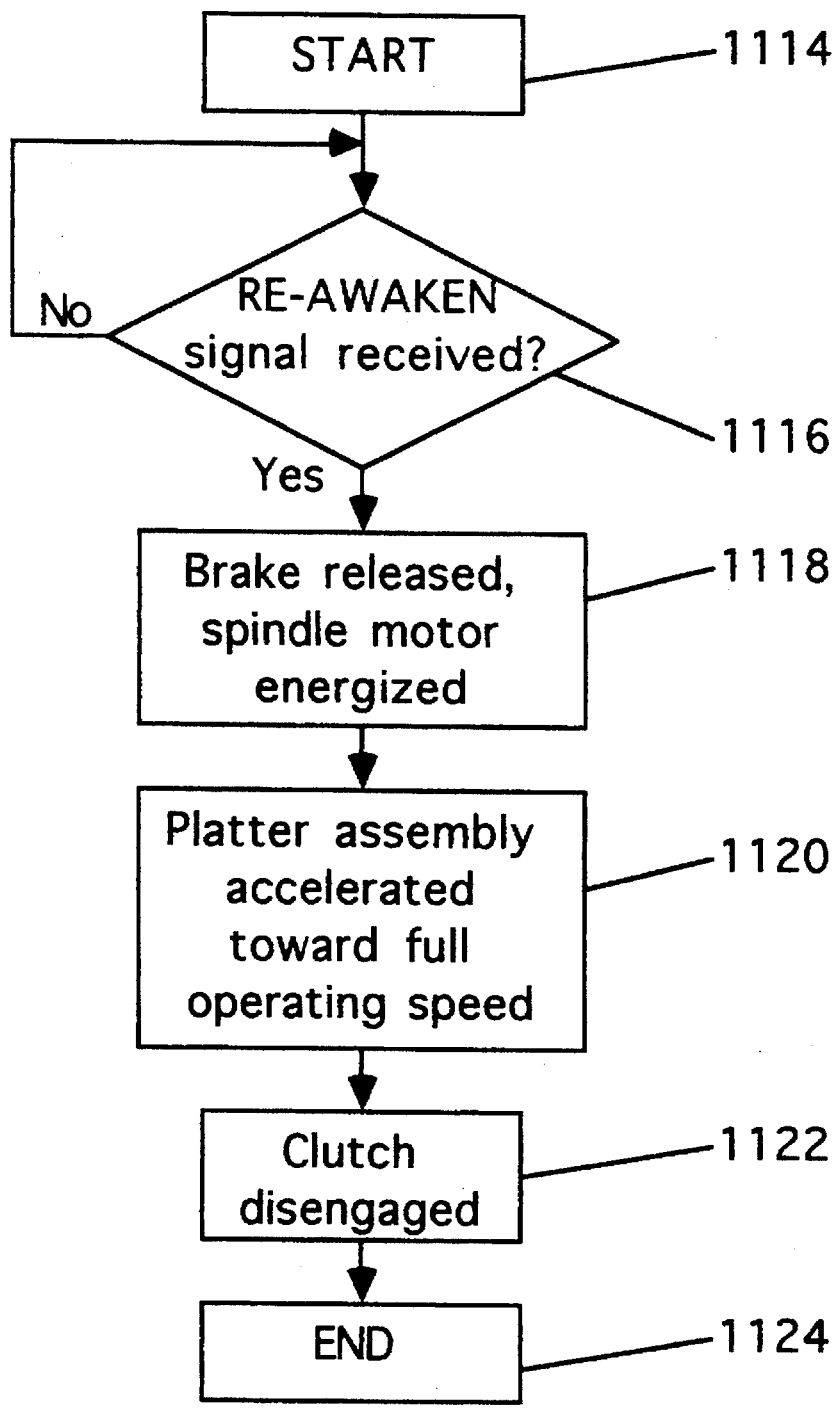
FIG. 11B shows the operation of the preferred starting sequence in flow chart form.
Figure 12A:
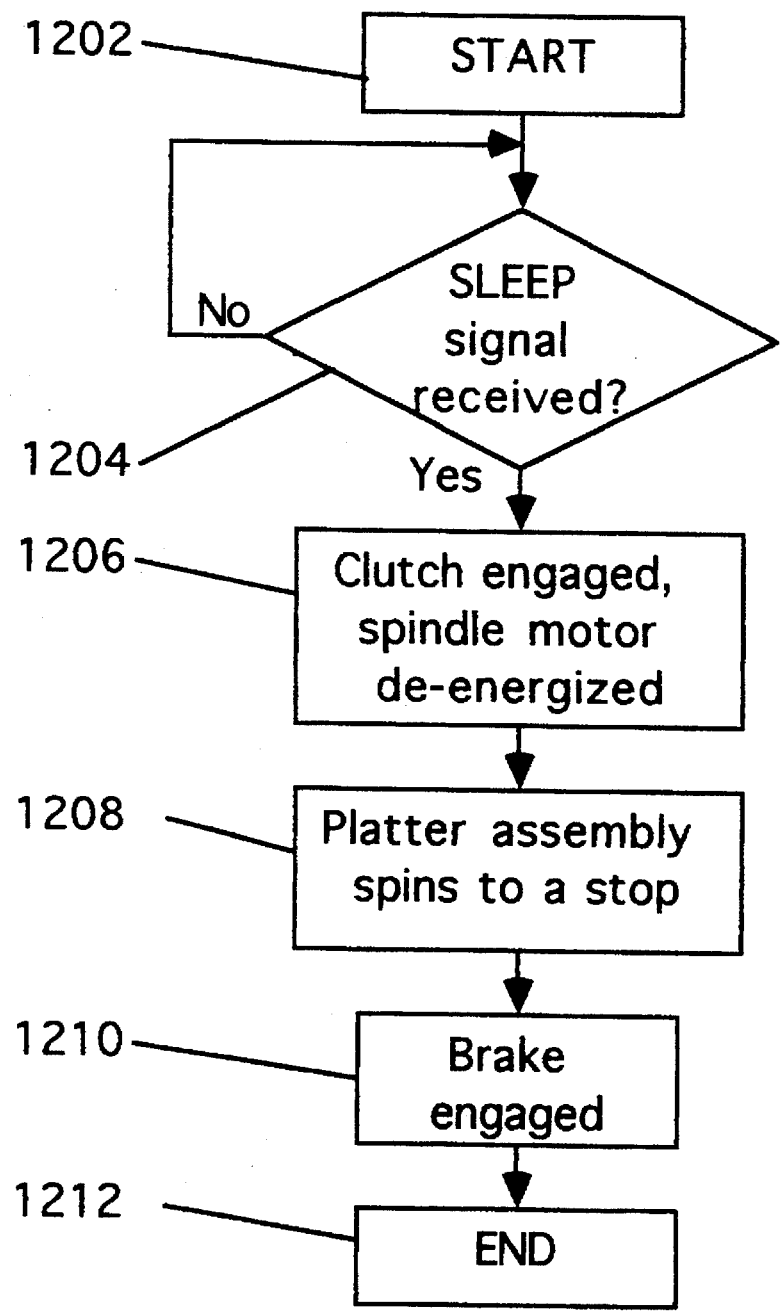
FIG. 12A shows the operation of an alternative stopping sequence in flow chart form.
Figure 12B:
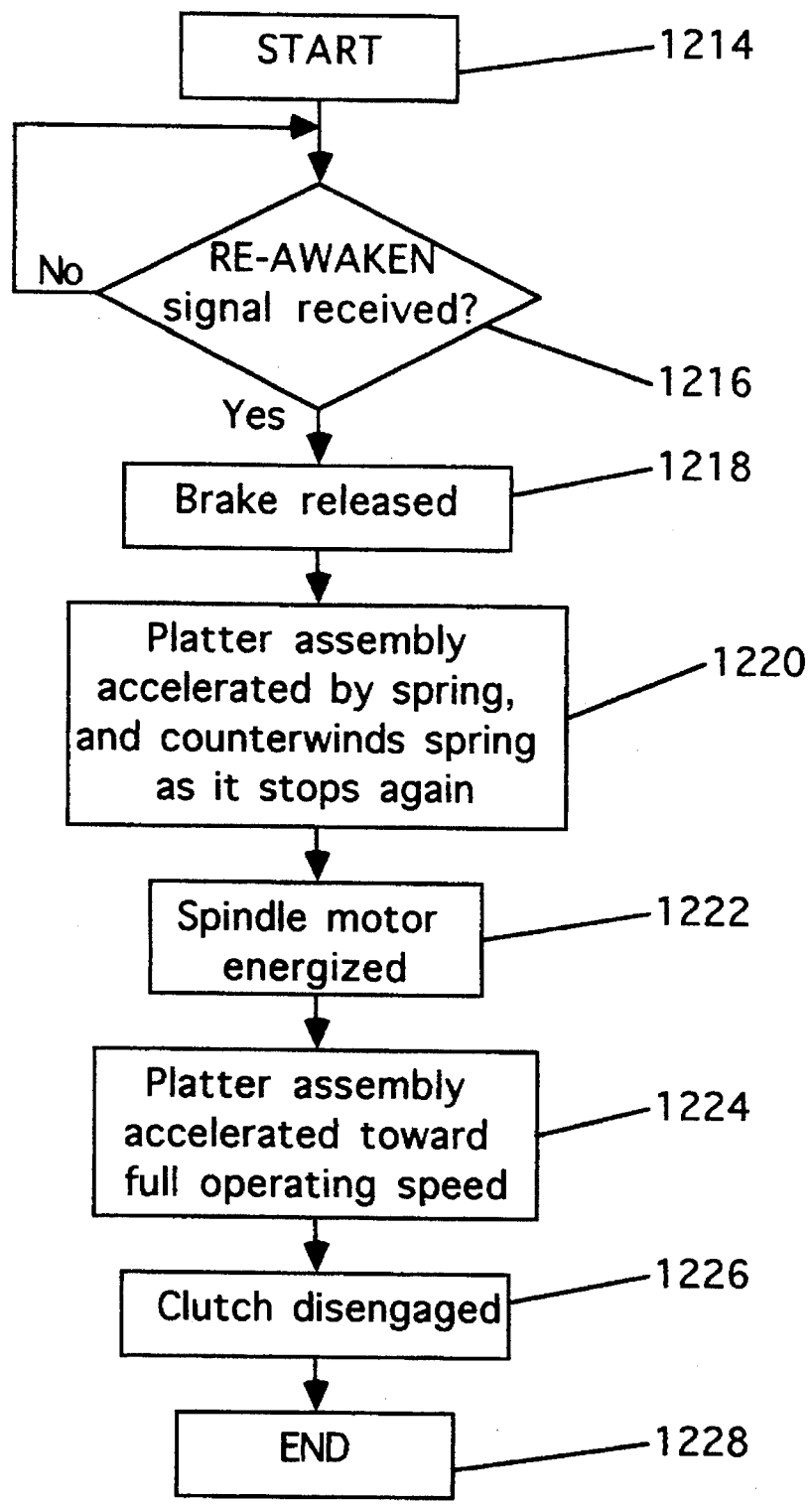
FIG. 12B shows the operation of an alternative starting sequence in flow chart form.

Two general methods of operating the starter of this invention are presented in FIGS. 11A, 11B, 12A, and 12B. FIGS. 11A and 11B show the preferred method for stopping and starting, respectively, of the platter assembly. The preferred method of operation, analogous to that described in the Operation section above, involves allowing the platter assembly to self-reverse during the stopping sequence. FIGS. 12A and 12B show an alternative method for stopping and starting, respectively, of the platter assembly. The alternative method of operation transfers the self-reversal of the platter assembly to the starting sequence. Both the preferred method of operation and the alternative method of operation are described in detail, below.

Preferred stopping sequence

Referring now to FIG. 11A, the preferred stopping sequence of the starter of this invention is shown in flow chart form. This preferred stopping sequence is analogous to that described in the Operation section above, and progresses as follows:

1. Box 1102: Start of preferred stopping sequence flow. Disk drive 100 is operating; that is, spindle motor 210 is energized and is maintaining the platter assembly at full operational rotating speed.

2. Box 1104: Awaiting SLEEP signal 722.

3. Box 1106: Upon receipt of SLEEP signal 722 from the drive electronics, solenoid control electronics 750 engage clutch top plate 202 and clutch bottom plate 204 via momentary application of electrical energy to clutch engaging solenoid 220. Spring 218 begins forward-winding. The drive electronics de-energize spindle motor 210.

4. Box 1108: The platter assembly spins to a stop, while in the process of stopping it converts its kinetic energy to potential energy in the form of forward-winding flexure in spring 218. Spring 218 then accelerates the platter assembly in the opposite direction until substantially all potential energy in spring 218 is reconverted to kinetic energy in the platter assembly, i.e., until spring 218 reaches its neutral position. The platter assembly continues to rotate backwards due to inertia, and reverse-winds spring 218, again converting the kinetic energy in the platter assembly into potential energy in spring 218, but in the opposite direction of the first winding action. This reverse-winding continues until the platter assembly stops again.

5. Box 1110: Solenoid control electronics 750 momentary apply electrical energy to brake engaging solenoid 214. This locks the platter assembly into a stopped position.

6. Box 1112: The stopping sequence is finished. Spring 218 contains substantially all of the former kinetic energy the platter assembly possessed when spinning at full rotational speed, less frictional and vibrational losses. Spring 218 thus stands ready to re-impart this energy to the platter assembly at start-up. In addition, spring 218 is wound in the direction necessary to apply acceleration in the direction of normal operational rotation of the platter assembly at start-up.

Preferred starting sequence

Referring now to FIG. 11B, the preferred stopping sequence of the starter of this invention is shown in flow chart form. This preferred starting sequence is analogous to that described in the Operation section above, and progresses as follows:

1. Box 1114: Start of preferred starting sequence flow. Disk drive 100 is in its stopped or sleeping mode.

2. Box 1116: Awaiting RE-AWAKEN signal 724.

3. Box 1118: Upon receipt of RE-AWAKEN signal 724, solenoid control electronics 750 free the platter assembly for rotation via o entary application of electrical ener y to brake releasing solenoid 216. The disk drive electronics energize spindle motor 210.

4. Box 1120: Both spring 218 and spindle motor 210 apply rotational force to the platter assembly in the direction of normal operational rotation, accelerating it toward full operating speed.

5. Box 1122: Spring 218 has converted substantially all its potential energy into kinetic energy in the form of platter assembly rotation. The platter assembly has achieved very nearly full operating speed. Solenoid control electronics 750 momentarily apply electrical energy to clutch releasing solenoid 222, disengaging clutch top plate 202 from clutch bottom plate 204.

6. Box 1124: The preferred starting sequence concludes. Spindle motor 210 continues to operate, providing the final fraction of acceleration necessary to make up for losses experienced during stopping and starting sequences. Spindle motor 210 then maintains the platter assembly at normal operating speed.

Alternative stopping sequence

Referring now to FIG. 12A, an alternative stopping sequence for the starter of this invention is shown in flow chart form. This alternative stopping sequence, in conjunction with the alternative starting sequence of FIG. 12B, postpones the self-reversing action of the platter assembly until the time at which disk drive 100 is started or re-awakened. The alternative stopping sequence of FIG. 12A progresses as follows:

1. Box 1202: Start of alternative stopping sequence flow. Disk drive 100 is operating; that is, spindle motor 210 is energized and the platter assembly is rotating at full operational speed.

2. Box 1204: Awaiting SLEEP signal 722.

3. Box 1206: Upon receipt of SLEEP signal 722, solenoid control electronics 750 engage clutch top plate 202 and clutch bottom plate 204 via momentary application of electrical energy to clutch engaging solenoid 220. Spring 218 begins forward-winding. The drive electronics de-energize spindle motor 210.

4. Box 1208: The platter assembly spins to a stop, while in the process of stopping it converts its kinetic energy to potential energy in the form of forward-winding flexure in spring 218.

5. Box 1210: Solenoid control electronics 750 engage the brake via momentary application of electrical energy to brake engaging solenoid 214. This locks the platter assembly into a stopped position.

6. Box 1212: The stopping sequence is finished. Spring 218 contains substantially all of the former kinetic energy the platter assembly possessed when spinning at full rotational speed, less the relatively small frictional and vibration losses incurred during the stopping sequence. Spring 218 thus stands ready to re-impart this energy to the platter assembly at start-up. Spring 218 is wound, however, in the direction which will initially accelerate the platter assembly in the direction opposite to that of normal operation at the beginning of the starting sequence.

Alternative starting sequence

Referring now to FIG. 12B, an alternative starting sequence of the of this invention is shown in flow chart form. This alternative starting sequence progresses as follows:

1. Box 1214: Start of alternative starting sequence flow. Disk drive 100 is in its stopped or sleeping mode.

2. Box 1216: Awaiting RE-AWAKEN signal 724.

3. Box 1218: Upon receipt of RE-AWAKEN signal 724, solenoid control electronics 750 free the platter assembly for rotation via momentary application of electrical energy to brake releasing solenoid 216.

4. Box 1220: Spring 218 accelerates the platter assembly in the opposite direction of its normal operational rotation until substantially all the potential energy in spring 218 is re-convened to kinetic energy in the platter assembly, i.e., until spring 218 reaches its neutral position. The platter assembly continues to rotate backwards due to inertia and reverse-winds spring 218, again converting the kinetic energy in the platter assembly into potential energy in spring 218, but in the opposite direction. This reverse-winding continues until the platter assembly stops.

5. Box 1222: The drive electronics energize spindle motor 210.

6. Box 1224: Both spring 218 and spindle motor 210 apply rotational force to the platter assembly in the direction of normal operational rotation, accelerating it toward full operating speed.

7. Box 1226: Spring 218 has converted substantially all its potential energy into kinetic energy in the form of platter assembly rotation. The platter assembly has achieved very nearly full operating speed. Solenoid control electronics 750 momentarily apply electrical energy to clutch releasing solenoid 222.

8. Box 1228: The alternative starting sequence concludes. Spindle motor 210 continues to operate, providing the final fraction of acceleration necessary to make up for losses experienced during stopping and starting sequences. Spindle motor 210 then maintains the platter assembly at normal operating speed.

CONCLUSIONS, RAMIFICATIONS, AND SCOPE OF INVENTION

Accordingly, the reader will see that the starter of this invention serves to accelerate disk drive 100 platter assembly to full operating speed much more quickly than is possible with spindle motor 210 alone. This would clearly add to the convenience of operation and overall responsiveness in computing systems which employ a duly-equipped disk drive. In addition, a reduction in size and cost of both spindle motor 210 and associated motor driver electronics becomes possible because the start-up surge burden on each is greatly reduced. This has the effect of conserving energy and increasing battery life, as well. Furthermore, the starter of this invention allows the computer host to put disk drive 100 to sleep after shorter pauses in host activity because disk drive 100 can be re-awakened more quickly. Since this further reduces the total amount of time disk drive 100 is awake, it conserves additional energy and further extends battery life. In addition, spring 218 winding and torque reversal is achieved by starter of this invention without any gearing or other complex torque reversing mechanism, improving manufacturability and enhancing reliability.

Figure 8C:
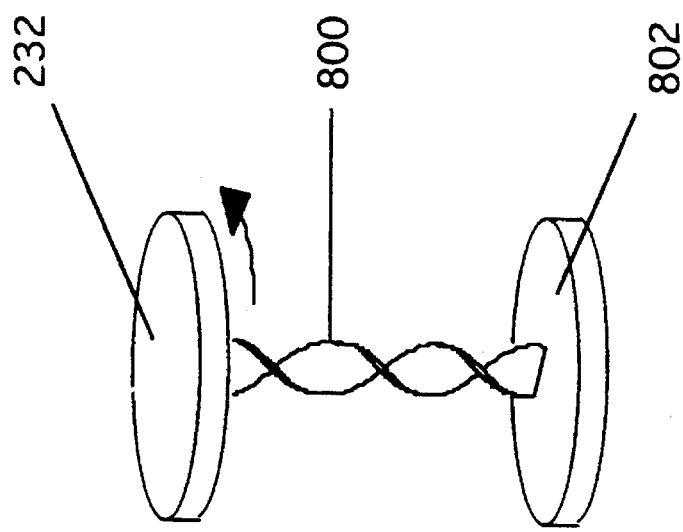
FIGS. 8A through 8C show an alternative embodiment of the spring used in the starter of this invention.
Figure 8B:
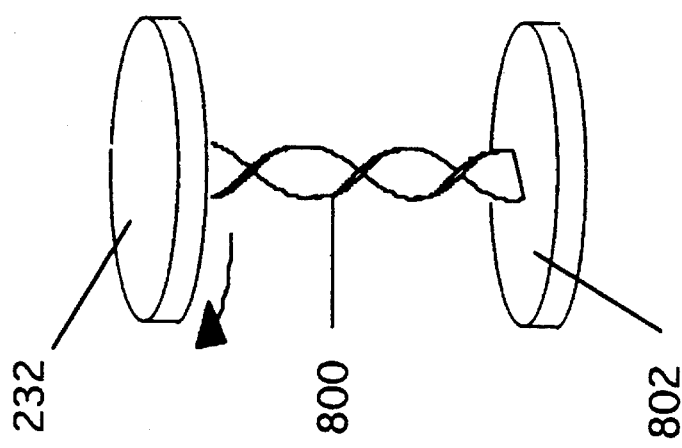
Figure 8A:
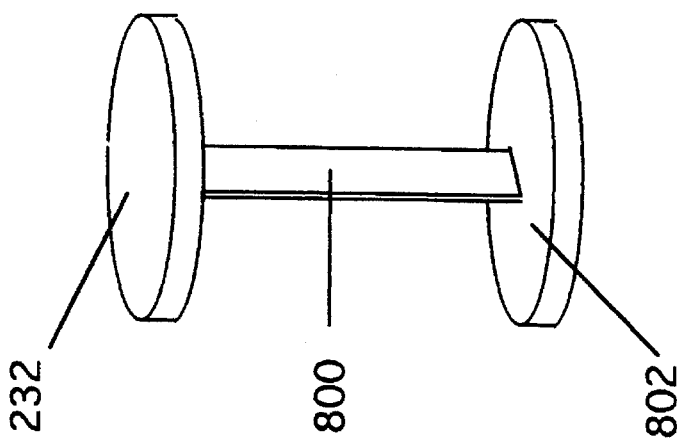
Figure 9C:
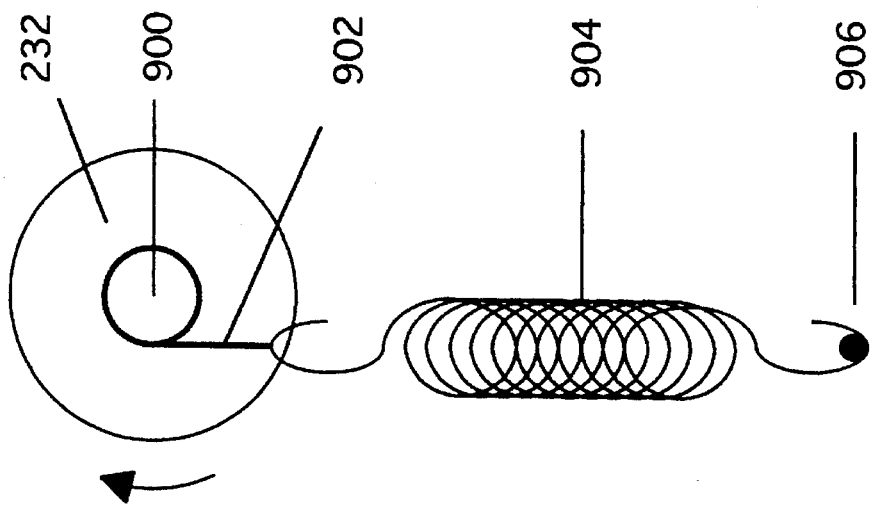
FIGS. 9A through 9C show yet another alternative embodiment of the spring used in the starter of this invention.
Figure 9B:
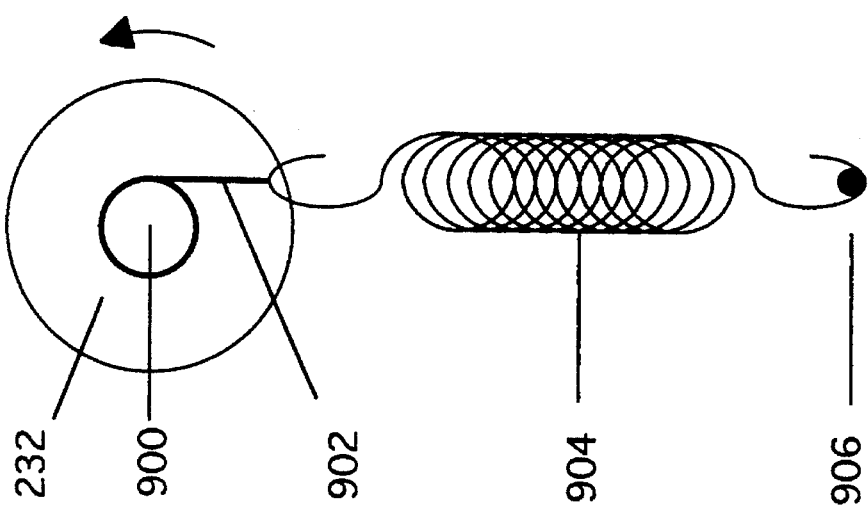
Figure 9A:
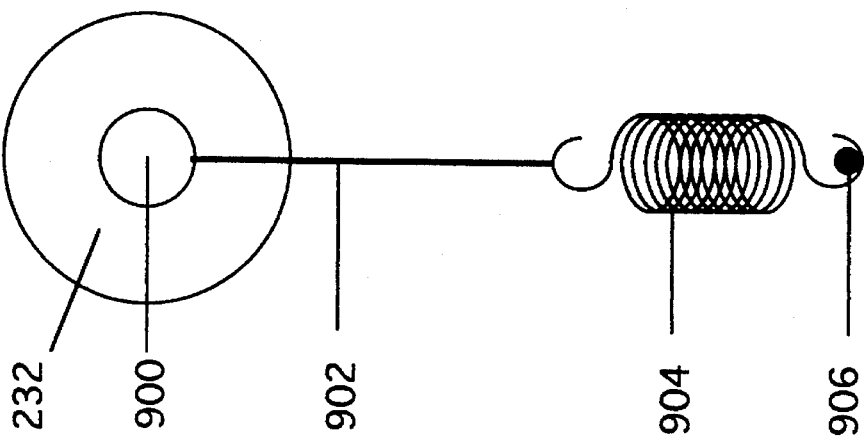

While the above description contains many specificities, these should not be construed as limitations on the scope of this invention, but as merely providing illustration of preferred embodiments of this invention. Many other variations are possible. For example, FIGS. 8A–8C (not drawn to scale) show an alternative embodiment for spring 218. Here, a simple, flat spring 800 is fastened between spring hub 232 and a spring base 802. Spring base 802 attaches to chassis 102 (not shown) or to cowling 224 (also not shown) to prevent rotation. Spring hub 232 may then rotate either clockwise, as shown in FIG. 8B, or counter-clockwise, as shown in FIG. 8C. FIGS. 9A–9C show yet another alternative embodiment for spring 218. Here, a helical-coil spring 904 attaches on one end to a stationary point in disk drive 100 such as chassis 102 (not shown) by a fastening pin 906. Spring 904 attaches on its other end to a wire or string 902. The opposite end of string 902 fastens to a point on the perimeter of a pulley 900. Pulley 900 attaches to spring hub 232. When spring hub 232 and pulley 900 rotate, string 902 wraps around pulley 900, stretching spring 904 (storing energy). FIGS. 9B and 9C demonstrate spring 904 stretching under counter-clockwise and clockwise rotation, respectively, of spring hub 232 and pulley 900. Either alternative embodiment for spring 218 illustrated above would produce substantially identical operation to that of sub-springs 218A and 218B in the starter of this invention.

Figure 10B:
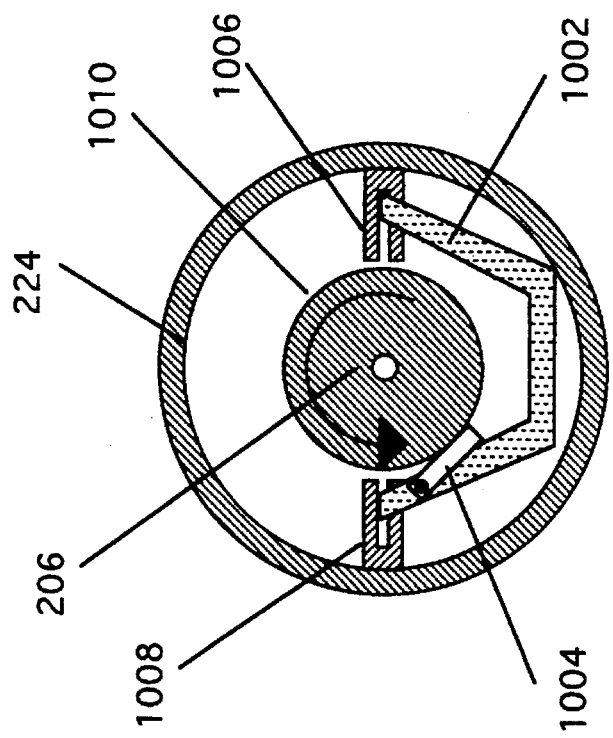
FIGS. 10A and 10B show an alternative embodiment of the stopping mechanism of the starter of this invention involving a ratchet.
Figure 10A:
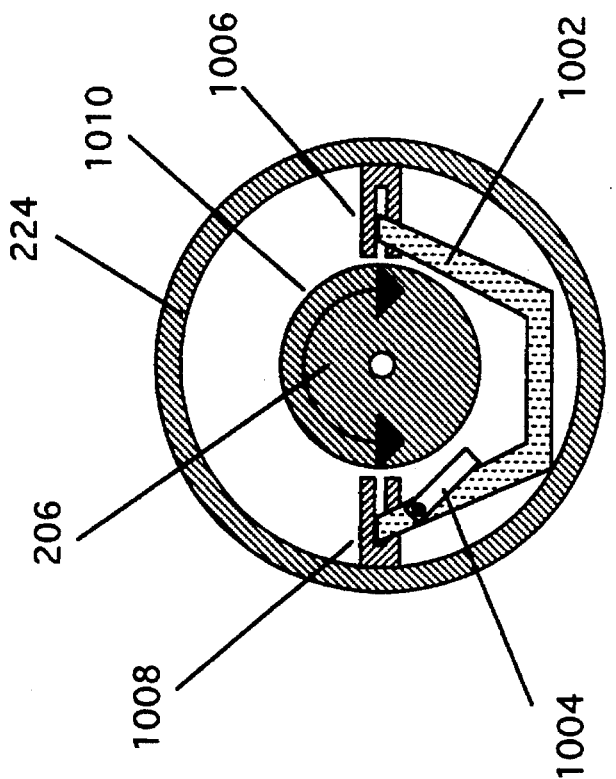

Yet another variation on the starter of this invention involves replacing the braking mechanism of FIGS. 5A and 5B with a ratchet mechanism configured for selective engagement, as shown in FIGS. 10A and 10B. This ratchet mechanism consists of a sliding ratchet frame 1002, a dog 1004, a ratchet engaging solenoid 1006, a ratchet disengaging solenoid 1008, and a ridged hub surface 1010. When disk drive 100 is awake and the platter assembly is spinning in a clockwise (for the purpose of example) direction, frame 1002 resides in its left-hand position (FIG. 10A). The arrows on drive shaft 206 in FIG. 10A show freedom of rotation in both directions. At the initiation of the stopping sequence, frame 1002 would remain in the left-hand position until after the platter assembly had decelerated, stopped, and begun rotating in the counter-clockwise direction. Solenoid 1006 would then pull frame 1002 to the right. The arrow shown on drive shaft 206 in FIG. 10B shows freedom of rotation in only the counter-clockwise direction. Dog 1004 would allow this counter-clockwise rotation until the platter assembly came to its second stop and then "catch" or hold it as it attempted to begin rotating clockwise again. This would complete the platter assembly stopping and spring 218 wind-up sequence. Upon disk drive 100 re-awakening, solenoid 1008 would pull frame 1002 to the left, releasing the platter assembly to begin its spring-assisted start. All clutch operation during both stopping and starting sequences would be identical to that described in the Operation section, above.

The usage of the starter of this invention also need not be restricted to starting of rotating data storage media alone. Many other fields of endeavor exist where the starter of this invention could be used to significant advantage. For example, tape recording devices which employ rotating heads, such as vertical helical scan (VHS) video recorders and digital audio tape (DAT) recorders, could benefit from the capability to stop the head rotation during "pause" or "stop" modes, and re-start the head again when "playback" or "record" modes are called for. This would serve to minimize wear on the tape, head, and head motor. In fact, the starter of this invention could be used to significant advantage in many machines which implement pauses in the motion of rotating element(s) which must quickly return to full rotating speed on demand.

A variety of additional modifications and variations on the starter of this invention could be provided involving, for example, drills, wire-wrap tools, impact wrenches, tape recorder capstan mechanisms, dictation cassette recorders, windshield wiper mechanisms, and so forth.

The scope of this invention should thus not be limited by or to the embodiments illustrated, but by the appended claims and their legal equivalents.

What is claimed is:

1. In a disk drive having a motor, a rotatable shaft coupled to impart rotational force to a data storage medium, and a starter means, said starter means comprising an energy storage means, an energy diverting means for selectively transferring rotational energy of said rotatable shaft into said energy storage means and transferring energy stored within said energy storage means to said rotational shaft as rotational energy, a holding means, and a control means for controlling the operation of said energy diverting means and said holding means, a method for starting of said shaft comprising the steps of:

applying force to said shaft with said motor until said shaft revolves at a final rotational speed in a first direction of rotation;

stopping rotation of said shaft by performing the substeps of:

diverting rotational energy from at least one complete revolution of said shaft corresponding to said first direction of rotation into said energy storage means by engaging said energy diverting means in response to a first signal received from said control means, thereby causing said shaft to come to a first stopped position;

diverting energy stored in said energy storage means into said shaft as rotational energy with said energy diverting means to produce at least one complete revolution of said shaft in a second direction of rotation, said second direction of rotation opposite to said first direction of rotation; and diverting rotational energy from at least one complete revolution of said shaft corresponding to said second direction of rotation into said energy storage means with said energy diverting means, thereby causing said shaft to come to a second stopped position;

holding said shaft in said second stopped position with said holding means in response to a second signal received from said control means;

releasing said shaft from said second stopped position by releasing said holding means in response to a third signal received from said control means; and diverting stored energy from said energy storage means to said shaft as rotational energy with said energy diverting means.

2. In a disk drive having a motor, a rotatable shaft coupled to impart rotational force to a data storage medium, and a starter means, said starter means comprising an energy storage means, an energy diverting means for selectively transferring rotational energy of said rotatable shaft into said energy storage means and transferring energy stored within said energy storage means to said rotational shaft as rotational energy, a holding means, and a control means for controlling the operation of said energy diverting means and said holding means, a method for starting of said shaft comprising the steps of:

applying force to said shaft with said motor until said shaft revolves at a final rotational speed in a first direction of rotation;

stopping rotation of said shaft by diverting rotational energy from at least one complete revolution of said shaft corresponding to said first direction of rotation into said energy storage means by engaging said energy diverting means in response to a first signal received from said control means, thereby causing said shaft to come to a first stopped position;

holding said shaft in said first stopped position with said holding means in response to a second signal received from said control means;

releasing said shaft from said first stopped position by releasing said holding means in response to a third signal received from said control means; and diverting stored energy from said energy storage means to said shaft as rotational energy by performing the substeps of:

diverting energy stored in said energy storage means into said shaft as rotational energy with said energy diverting means to produce at least one complete revolution of said shaft in a second direction of rotation, said second direction of rotation opposite to said first direction of rotation;

diverting rotational energy from at least one complete revolution of said shaft corresponding to said second direction of rotation into said energy storage means with said energy diverting means, thereby causing said shaft to come to a second stopped position; and diverting energy stored in said energy storage means into said shaft as rotational energy to produce at least one complete revolution of said shaft in said first direction of rotation with said energy diverting means.

3. A starter means for a disk drive having a rotatable data storage medium, said starter means comprising:

an energy storage means comprising a first spring wound in a first direction and a second spring wound in opposition to said first spring;

an energy diverting means, for selectively diverting rotational energy from said rotatable data storage medium into said energy storage means, and for selectively diverting energy stored in said energy storage means into said rotatable data storage medium, said energy dive means coupled to said energy storage means and selectively coupled to said rotatable data storage medium;

a holding means, for selectively maintaining said rotatable data storage medium in a stopped position; and a control means, for controlling said energy diverting means and said holding means wherein said first spring selectively exchanges energy with said rotatable data storage medium about a first direction of rotation and said second spring selectively exchanges energy with said rotatable data storage medium about a second direction of rotation, such that said energy storage means, in conjunction with said energy diverting means and holding means, stop and start said rotatable data storage medium under the direction of the control means.

4. The starter means of claim 3, wherein said energy diverting means comprises a clutch.

5. The starter means of claim 3, wherein said holding means comprises a brake.

6. The starter means of claim 3, wherein said holding means comprises a ratchet.

7. The starter means of claim 3, wherein said control means comprises a first control element for engaging said energy diverting means at a predetermined engaging time, said predetermined engaging time corresponding to an initiation of stopping of rotation of said rotatable data storage medium.

8. The starter means of claim 7, wherein said control means further comprises a second control element for disengaging said holding means at a predetermined release time, said predetermined release time corresponding to an initiation of starting of said rotatable data storage medium.

9. The starter means of claim 8, wherein said control means further comprises a third control element for disengaging said energy diverting means at a predetermined disengaging time, said predetermined disengaging time corresponding to completion of a sequence comprising the steps of:

(a) said initiation of starting of said rotatable data storage medium; and (b) a substantial completion of transfer of said stored energy from said energy storage means into said rotatable data storage medium as said kinetic energy of rotation.

10. The starter means of claim 7, wherein said control means further comprises a control element for engaging said holding means at a predetermined holding time, said predetermined holding time corresponding to the completion of a sequence comprising the steps of:

(a) said initiation of stopping of said rotatable data storage medium; and (b) a full stop of rotation of said rotatable data storage medium, constituting a transfer of said kinetic energy of rotation into potential energy in said energy storage means.

11. A starter means for a disk drive having a rotatable data storage medium, said starter means comprising:

an energy storage means, for storing energy for starting said rotatable data storage medium;

an energy diverting means, for selectively diverting rotational energy from said rotatable data storage medium into said energy storage means, and for selectively diverting energy stored in said energy storage means into said rotatable data storage medium;

a holding means, for selectively maintaining said rotatable data storage medium in a stopped position; and a control means, for controlling said energy diverting means and said holding means, said control means comprising a first control element for engaging said energy diverting means at a predetermined engaging time, said predetermined engaging time corresponding to an initiation of stopping or rotation of said rotatable data storage medium, said control means further comprising a second control element for engaging said holding means at a predetermined holding time, said predetermined holding time corresponding to the completion of a sequence comprising the steps of:

(a) said initiation of stopping of said rotatable data storage medium;

(b) a full stop of rotation of said rotatable data storage medium, constituting a transfer of kinetic energy of rotation into potential energy in said energy storage means;

(c) a reversal of rotation of said rotatable data storage medium, constituting a transfer of potential energy in said energy storage means back into kinetic energy of rotation in said rotatable data storage medium; and (d) a second full stop of rotation of said rotatable data storage medium, constituting a second transfer of kinetic energy of rotation into potential energy in said energy storage means;

said control means further comprising a third control element for disengaging said energy diverting means at a predetermined disengaging time, said predetermined disengaging time corresponding to completion of a sequence comprising the steps of:

(a) said initiation of starting of said rotatable data storage medium; and (b) a substantial completion of transfer of said stored energy from said energy storage means into said rotatable data storage medium as said kinetic energy of rotation.

12. A starter means for a disk drive having a rotatable data storage medium, said starter means comprising:

an energy storage means, for storing energy for starting said rotatable data storage medium;

an energy diverting means, for selectively diverting rotational energy from said rotatable data storage medium into said energy storage means, and for selectively diverting energy stored in said energy storage means into said rotatable data storage medium;

a holding means, for selectively maintaining said rotatable data storage medium in a stopped position; and a control means, for controlling said energy diverting means and said holding means, said control means comprising a first control element for engaging said energy diverting means at a predetermined engaging time, said predetermined engaging time corresponding to an initiation of stopping of rotation of said rotatable data storage medium, said control means further comprising a second control element for engaging said holding means at a predetermined holding time, said predetermined holding time corresponding to a full stop of rotation of said rotatable data storage medium, said control means further comprising a third control element for disengaging said holding means at a predetermined release time, said predetermined release time corresponding to an initiation of starting of rotation of said rotatable data storage medium, said control means further comprising a fourth control element for disengaging said energy diverting means at a predetermined disengaging time, said predetermined disengaging time corresponding to completion of a sequence comprising the steps of:

(a) said initiation of starting of said rotatable data storage medium;

(b) a first full acceleration of rotation of said rotatable data storage medium, constituting a transfer of said potential energy of rotation in said rotatable data storage medium;

(c) a full stop of rotation of said rotatable data storage medium, constituting a transfer of said kinetic energy of rotation back into said potential energy in said energy storage means; and (d) a second full acceleration of rotation of said rotatable data storage medium, constituting a second transfer of said potential energy in said energy storage means into said kinetic energy of rotation in said rotatable data storage medium.

* * * * *